United States Patent [19]

Potthast

[11] Patent Number: 4,997,663
[45] Date of Patent: Mar. 5, 1991

[54] PROCESS FOR USING MULTIPLE REUSABLE TUBULAR CASINGS IN THE PRODUCTION OF CASELESS (SKINLESS) PARBOIL OR RAW SAUSAGES

[75] Inventor: Karl Potthast, Kulmbach, Fed. Rep. of Germany

[73] Assignee: Food Technology Transfer, S.A., Luxembourg, Luxembourg

[21] Appl. No.: 669,711

[22] Filed: Nov. 9, 1984

Related U.S. Application Data

[63] Continuation-in-part of Ser. No. 437,848, Oct. 29, 1983, abandoned, which is a continuation-in-part of Ser. No. 410,062, Aug. 19, 1982, abandoned, which is a continuation-in-part of Ser. No. 388,946, Jun. 16, 1982, abandoned.

[51] Int. Cl.$^5$ .................. A22C 11/00; A23L 1/317
[52] U.S. Cl. .................. 426/241; 426/105; 426/135; 426/412; 426/413
[58] Field of Search .......... 426/105, 118, 135, 234, 426/241, 243, 284, 315, 395, 412, 413, 415, 513, 523, 126; 138/118.1; 428/36, 34.8; 17/49

[56] References Cited

U.S. PATENT DOCUMENTS

| | | | |
|---|---|---|---|
| 1,964,009 | 6/1934 | Vogt | 426/315 |
| 1,964,011 | 6/1934 | Vogt | 426/315 X |
| 2,995,449 | 8/1961 | Allen et al. | 426/315 |
| 3,121,638 | 2/1964 | Tauber et al. | 426/315 X |
| 3,132,950 | 5/1964 | Macy et al. | 17/49 X |
| 3,170,797 | 2/1965 | Sloan et al. | 426/315 |
| 3,421,434 | 1/1969 | Krachmer | 426/513 X |
| 4,294,858 | 10/1981 | Moule | 426/243 |
| 4,371,554 | 2/1983 | Becker | 426/243 |
| 4,379,356 | 4/1983 | Geissbuhler | 426/513 |

FOREIGN PATENT DOCUMENTS

| | | | |
|---|---|---|---|
| 132955 | 1/1948 | Austria | 426/105 |
| 0028858 | 5/1981 | European Pat. Off. | |
| 259140 | 6/1911 | Fed. Rep. of Germany | |
| 913033 | 6/1954 | Fed. Rep. of Germany | 426/105 |
| 1207234 | 12/1965 | Fed. Rep. of Germany | |
| 987603 | 3/1965 | United Kingdom | 426/513 |

*Primary Examiner*—Arthur L. Corbin
*Attorney, Agent, or Firm*—Finnegan, Henderson, Farabow, Garrett & Dunner

[57] ABSTRACT

Parboil or raw "skinless" sausages are prepared using a reusable tubular casing formed from a lipophilic, relatively nonpolar material in a process wherein the casing is filled with uncoagulated sausage material containing protein and fat (lipids) and initially heated to a relatively high temperature for a short period of time (e.g. about 175°–250° C. for 2–3 minutes) to preferentially coagulate only the protein material immediately adjacent the casing to form a relatively thin (e.g. less than about 1 mm) cohesive, "skin-like" layer. The sausage is then removed, such as by ejection, for further processing, such as smoking, drying, reddening and final coagulation with the "skin-like" layer providing sufficient support for the subsequent processing of the substantially uncoagulated ejected sausage material, and the casing is simply rinsed and refilled. Both impermeable and microporous polytetrafluoroethylene is used for the reusable casing material, with the pores of the microporous material being filled with solidified fat (lipids) during the filling step and the melting point of the solidified fat being less than the temperature of the initial heating step.

12 Claims, 3 Drawing Sheets

PROCESS FOR USING MULTIPLE REUSABLE TUBULAR CASINGS IN THE PRODUCTION OF CASELESS (SKINLESS) PARBOIL OR RAW SAUSAGES

BACKGROUND OF THE INVENTION

This application is a Continuation-In-Part of application Ser. No. 437,848, filed Oct. 29, 1982, which is a Continuation-In-Part of application Ser. No. 410,062, filed Aug. 19, 1982, which is a Continuation-In-Part of application Ser. No. 388,946 filed June 16, 1982, all now abandoned.

1. Field of The Invention

This invention relates to improved process and apparatus for making caseless (skinless) sausage. In particular, this invention relates to a particular improved process for using reusable tubular casings, for making parboil or raw sausage and to an improved reusable tubular casing of the type formed from a material permeable to the flow of steam, water vapor, and other gases.

2. Description of The Prior Art

In general, the art recognized three types of sausages: cooking sausage, parboil sausage, and raw sausage. Cooking sausage has a high fat and protein content and accordingly contains a smaller amount of water than the parboil sausage. For this reason cooking sausage releases practically no water during the heating process, and can therefore be produced in casings that are impenetrable by water vapor and steam evolved during the sausage-making process. For example, many organic polymeric materials that are impervious to water and steam can be used with cooking sausage.

On the other hand, a larger amount of water is released during reddening and coagulation of the parboil sausage, and during the reddening and ripening process for raw sausage.

Parboil sausage is produced from an emulsion in water of a protein and fat. During the formation of this emulsion in high capacity grinding or cutting machines, ice is used for cooling.

For this reason, the bulk sausage contains more water than is permissible for the preservation of the sausage. Therefore, the bulk sausage must release about 5 to 50% (as an average about 10%) gaseous constituents, in relation to the raw (unprocessed sausage meat) weight during the entire sausage-making process. Generally speaking, a higher percentage of water is removed from the sausage material at the outside surface of the formed sausage to produce a cohesive, skin-like layer which promotes sausage integrity. The gaseous constituents consist for the most part of water vapor or steam, but also contain aromatic constituents and other volatile substances released during the heating steps for reddening and/or coagulation.

The reddening of parboil sausage occurs as a rule at about 35° C. within approximately 15 minutes; the coagulation must be carried out at temperatures above 45° C. and takes place in conventional processes as a rule by heating in water or steam at temperatures between 70° and 100° C., usually at about 80° C. in about another 45 minutes.

Almost all parboil sausages are smoked. It is a general practice to complete the smoking process after reddening, but before coagulation. Since the artificial sausage casings in use at the present time have little permeability for smoke, the smoking process normally takes a long time, up to about an additional 45 minutes.

Raw sausage is produced from bulk sausage which contains fat and meat pieces of various size. During the reddening and ripening process the bulk sausage releases gaseous constituents from about 10% to 50%, as related to the raw (unprocessed bulk) weight. These gaseous constituents also consist for the most part of water vapor; however, they also contain aromatic constituents and substances volatile under the conditions of the reddening and/or ripening process.

The reddening and ripening of raw sausage occurs at temperatures not above 40° C., as a rule at around 20° C. The reddening and ripening occurs quite slowly during the course of a few days up to several months. Some types of raw sausages are also smoked. In the reddening and ripening process for others, as for instance, salami, mildew (mold) is expected to form.

In original sausage making procedures, the bulk sausage was injected into a natural intestine and subsequently subjected to the treatment required by a particular type of sausage. Artificial intestines made of various materials have been known for quite some time. Most of the natural and artificial intestines used for sausage casings are inedible and must be removed before consumption. Therefore, it has become the practice to peel the sausage casing right at the production plant.

Another technique has been used in sausage making, namely the production of so-called caseless sausages (also designated as skinless sausages), in order to reduce the expense incurred in peeling the sausage casings, the loss of sausage material because the sausages break when the casings are peeled away, and, in addition, the quite sizable cost of the casings themselves.

According to German Patent Publication DE-OS-25 23 506, caseless sausages are produced continuously by a machine that is provided with numerous molds, which after removal of the formed and cooked sausage, and after cleaning, can be used again. One by one these molds pass through a fill station in the machine; a boiling or, as the case may be, a cooking oven; a cooling station; and a mold removal station, whereby between the mold removal station and the following fill station preferably a wash and/or cleaning station is provided. The molds are preferably made of a material having a low coefficient of friction, for instance "tetrafluoroethylene". This designation obviously is to mean "polytetrafluoroethylene" (PTFE). It is believed these PTFE molds are impermeable to gas and water vapor.

German Patent Publication DE-OS 27 56 995 refers to a process and apparatus for the production of a skinless, chord-like sausage by means of a hull designed as a chord-shaped hollow body which is designated expressly as "practically medium-tight" or "practically medium-tight sealable". The inside of the hollow body may have a smooth anti-sticking layer which, for instance, could be a coating of polytetrafluoroethylene. According to the process described in DE-OS 27 56 995, the raw bulk sausage is filled into the casing, then heated, possibly followed by cooling, and finally divided into suitable lengths. The pressure created during heating due to the expansion of the bulk sausage causes a pressure seal which prevents vapor evolved during cooking from reaching the casing exit.

It is also known that a special paper made into an endless tube can be impregnated with viscose (a viscous solution of cellulosexanthogenate, which is used for the production of viscose rayon, viscose staple fibers, viscose cellophane and viscose sponges), to form a tubular casing which has a degree of porosity which permits the exchange of moisture and steam. Such viscose impregnated paper tubes can be used for sausages that are to be smoked, because their permeability allows for some penetration of smoke, at least to a degree that exceeds the smoke penetration of most other known sausage casings.

Experience has shown that all known multiple reusable but nonporous casings are not suitable for use with conventional processes for the production of sausage types which must release water vapor, steam and other gaseous constituents, because it is not possible to remove the water vapor, steam and other gaseous consitutents from the surface of the sausage material.

Also, a previous effort to use a finely perforated sausage wrapper having a large number of holes per square centimeter proved to have severe shortcomings with respect to providing a smooth outer surface, and presented cleaning problems.

In U.S. Pat. No. 4,371,554 there is disclosed a novel reusable casing made from highly porous polytetrafluoroethylene, and associated apparatus and process for making skinless sausages. Prior to the invention described in U.S. Pat. No. 4,371,554, the only commercially practical way to produce "skinless" sausages was to use disposable cellulosic or other artificial casings, capable of only a single use. Machines were used to fill the casings with the bulk sausage. The filled casings were lined up on a spit and then one after another subjected in the smoke chambers to, in sequence:

reddening
drying
smoking
cooking or parboiling
cooling

After leaving the heat treatment, smoking and cooling chambers, the sausage casings were removed by peel machines in order to produce "skinless" sausages. For this process a relatively large amount of manual labor was required.

The production of parboil sausage according to the process invention disclosed in U.S. Pat. No. 4,371,554 proceeds as follows:

(a) The raw bulk sausage can first be pre-reddened in a mixing machine under exclusion of oxygen. While not required to provide an integral, skinless sausage product, reddening is highly commercially desirable as the attractiveness of the final product is improved manyfold.

(b) The bulk sausage is filled into reusable casings and/or devices that are formed by a steam and water-vapor permeable membrane that is pliable, heat stable and nonadherent to bulk sausage by means of fill machines, paste fill machines or dividing machines, and applied to the casing.

(c) The filled casings or devices can then be heated to approximately 35° C. to attain a final desired degree of redness in a continuous reddening apparatus as, for example, by convection heating. Again, as with prereddening, this step is non-essential but highly commercially desirable. However, as this reddening step must be carried out with the sausage material in the casing, it adds to the casing cycle time and decreases the cost effectiveness of the process.

(d) Subsequently the filled casings or devices are heated for the coagulation step to about 80° C., as,
for instance, in the customary way by steam or hot air or especially advantageously by means of microwave energy.

(e) Next, the filled casings or devices are cooled, for example, by means of cold water, cold air, etc.

(f) Now the casings or devices are opened by automatic removal of the end caps, after which the sausage is ejected, for instance, by compressed air. The empty casings are returned in a closed cycle to the fill station, whereby, in suitable intervals, cleaning takes place, as for instance by ultrasonic waves.

(g) The sausages subsequently can be either continuously or intermittently smoked on appropriate conveyors or special racks having only a small contact area with each sausage. The tanning effect of the smoke further contributes to the integrity of the final sausage product and the inclusion of the smoking step reduces the time required for heating-coagulating prior to removal of the sausage from the casing.

(h) Subsequently, the sausages are cooled and are ready for shipment.

SUMMARY OF THE INVENTION

The present improvement invention involves the discovery that the cycle time for the individual casings can be substantially reduced relative to that afforded by the above-described prior art process by the use of a high temperature initial heating step to supplant or replace the relatively low temperature coagulating step used in U.S. Pat. No. 4,371,554. The high temperature heating is applied to the sausage through the casing, preferably by a hot air circulating oven to cause coagulation and drying of the sausage protein layer immediately adjacent the casing to rapidly provide an integral, thin skin-like layer completely surrounding the forming sausage. The skin-like layer formed in the present process is extremely thin relative to the diameter of the casing. The skin-like layer formed by the improved process was found to be stable enough and of sufficient durability to allow elimination of the need to partially coagulate the bulk, inner sausage material before ejection under some circumstances. In such circumstances the coagulating heating step can be accomplished after ejection and in parallel with other process steps. Also, it was found practical to delay the reddening step until after ejection, without a degradation in product appearance.

The present invention also involves the discovery that, for gas permeable reusable casings, the just described improved process can be further improved by the step of deliberately plugging the pores of the casing with fat (lipids) prior to the filling step. It has been determined that the fat (lipids) in the pores prevents migration of undesirable protein matter into the pores during the filling step but that the high temperature initial heating step melts the fat allowing the gas and water vapor pressure to pneumatically open the pores to provide radial venting. The use of such a "plugging step" in conjunction with the high temperature initial heating step has surprisingly allowed the use of porous casing materials having larger average pore sizes and larger casing thicknesses than the materials previously preferred, as in U.S. Pat. No. 4,371,554, due to the "valve" effect of the fat (lipids) in the pores. The present invention also encompasses the porous reusable casing having fat (lipids) plugging the pores.

The capital investment of an installation for the production of sausages with multiple reusable casings, utilizing the processes disclosed in U.S. Pat. No. 4,371,554, or the improved process of the present invention, depends mainly on the period of time required for the sausage to remain in the casing. Therefore this time must be kept to a minimum. It has been found that the high temperature initial heating step provides a thin integral skin on the sausage which enables the partially formed sausage to be handled. The release of water vapor, steam and other gaseous constituents from the surface region of the sausage, still occurs in the high temperature initial heating step while the sausage is in the casing. However, the amount of gas and water vapor release can be significantly reduced if the amount of coagulation is minimized, even to the extent of allowing the use of impermeable casings in certain situations.

More specifically, the present invention also involves the discovery that some types and sizes of parboil and raw sausages can advantageously be prepared by a high temperature initial heating process using reusable tubular casings formed of a material substantially impermeable to the flow of gas. The ability to produce these types of caseless sausages without the need for a material capable of radially venting water vapor and other gases evolved during the initial heating step should enable the use of a wider range of casing materials (non-porous, marginally porous, as well as porous) for making reusable casings for certain sausage types and sizes, and possible cost savings.

In accordance with the present invention, as embodied and disclosed herein, the process for the production of caseless parboil or raw sausages using multiple-reusable tubular casings comprises the steps of filling reusable casings with sausage material containing protein and fat (lipids); initially heating the outside surfaces of the filled casings to a high temperature for a time sufficient to coagulate substantially only the sausage material protein immediately adjacent the inner surfaces of the casings to rapidly form a skin-like layer, and to release the fat (lipids) from the sausage material in the skin-like layer, the released fat (lipids) flowing to, and collecting at, the inner surface of the casing; and removing the sausage material from the tubular casing, the integrity of the casing being maintained during the removing step, wherein the time and temperature of the initial heating step are selected to provide a continuous skin-like layer of coagulated protein sufficiently cohesive to render the removed sausage material self-supporting, and wherein the sausage material in the casing is substantially uncoagulated at the start of the initial heating step.

The accompanying drawing, which is incorporated in, and constitutes a part of, this specification illustrates the invention and, together with the description, serves to explain the principles of the invention.

DESCRIPTION OF THE PREFERRED EMBODIMENTS

The improved process of the present invention is best described in relation to the process disclosed in U.S. Pat. No. 4,371,554 of H. Becker. The Becker process yielded skinless sausages of acceptable quality, and at a production rate suitable for commercial operation. Tests had shown that the cycle time for an individual reusable casing in the Becker process was about 45 minutes, that is, from filling, through in-casing processing, to refilling. This was believed to be the minimum time necessary to achieve a self-supporting sausage product with sufficient internal cohesion to allow further processing (such as smoking) outside the reusable casing. The smoking of "naked" sausages, of course, can be accomplished in much shorter time compared to a process wherein sausages are held in disposable cellulosic casings which tend to act like a filter. And, the fact that a process step could be performed outside the casing allowed parallel processing resulting in a more efficient operation.

The discoveries leading to the present invention have demonstrated improvements to the process disclosed in U.S. Pat. No. 4,371,554 which can result in greater than a 10 fold reduction in the cycle time for the casings, from about 45 minutes to approximately 3 minutes. These improvements are expected to allow at least 20 sausages to be produced per casing per hour, so that a nominal 30,000 sausage/hour frankfurter production line would require only about 1500 casings, instead of approximately 23,000 casings, a significant cost reduction.

Figure 1:
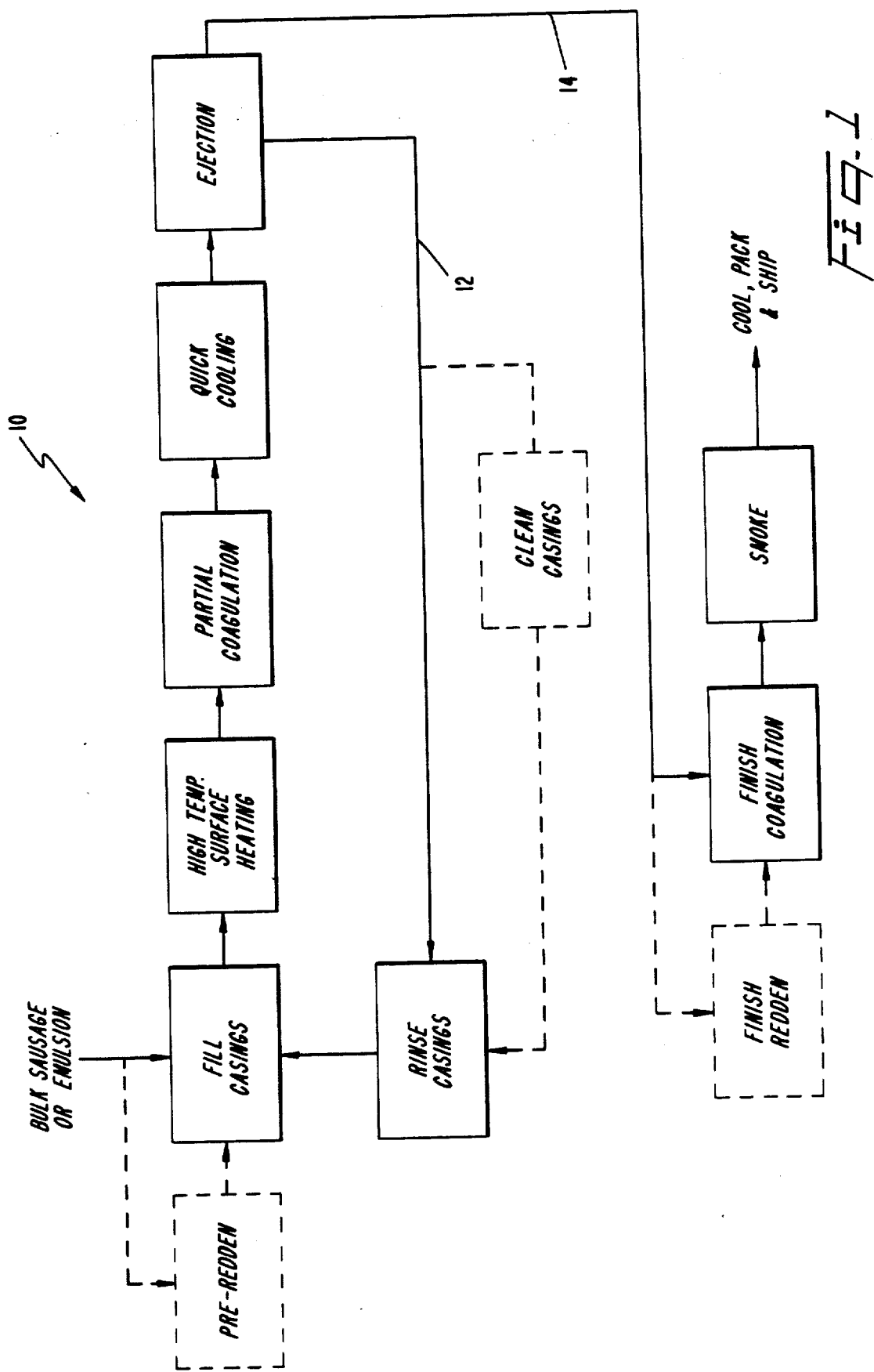
FIG. 1 is a schematic diagram of one embodiment of the process of the invention for making skinless sausages.

With reference to the process depicted schematically and designated generally by the numeral 10 in FIG. 1, sausage material such as raw meat and fat pieces or sausage emulsion is loaded into a radially porous reusable casing, for example the pliable microporous expanded PTFE casing such as disclosed in U.S. Pat. No. 4,371,554 or the improved pliable reusable casing disclosed in the application of H. Becker (Ser. No. 388,945, now abandoned). Such a microporous polytetrafluoroethylene has a microstructure of nodes interconnected with fibrils. As depicted by the broken lines in FIG. 1, the sausage material can be first pre-reddened, as explained previously.

In accordance with the present invention, the filled casing is initially heated by exposing the outer surface of the casing to a high temperature heat source which coagulates and dries substantially only the sausage material immediately adjacent the casing inner surface. The high rate of heat transfer in the process of the present invention results in the rapid formation of a skin-like region of less than about 1 mm in thickness. This skin enables the subsequent in-casing heating for reddening and coagulating to be drastically curtailed and even to be eliminated entirely and still result in a sausage that maintains sufficient integrity to withstand ejection and further processing in a "naked" condition.

In tests following the embodiment of the present invention corresponding to FIG. 1, filled casings were placed in a circulating hot air chamber at about 175° C. for approximately 2 minutes, during which time the "skin" formed. The 175° C. was the maximum temperature obtainable in the particular apparatus used. An upper temperature limit, if one exists, may be dictated by the limitation of the casing material. The softening temperature of the PTFE used in the casing disclosed in U.S. Pat. No. 4,371,554 is about 270° C. Other apparatus or casing materials such as that used in the casing support structure may have even lower softening points. However, the relatively short duration of the initial heating step may allow these temperature limits to be briefly exceeded without degrading the casing or support apparatus. It is thought that temperatures below about 130° C. would be commercially impractical.

As evidence of the preferential coagulation and drying of the surface layer caused by the high temperature initial heating step of the present invention, analysis of a sample sausage cross section from the above-described test showed the interior of the sausage to have a water content of less than or equal to about 60%, approximately that of the starting emulsion. However, the thin skin had a water content of only about 40%, that is, about one-third less than the interior, showing the effects of the high gradient in temperature caused by heating through the casing. It was believed that, contrary to the process in U.S. Pat. No. 4,371,554 where microwave heating was the preferred mode of heating for all the coagulation, the initial high temperature heating step of the present invention should employ hot, dry circulating air impinging on the outer surface of the casing.

Because the inner part of the sausage was soft and uncoagulated in the above tests, the filled and initially heated casings were then briefly heated in a microwave oven for approximately 15 seconds to partially coagulate the bulk inner sausage material. The use in the process embodiment shown in FIG. 1 of a partial coagulating step, compared to the full coagulating step used in U.S. Pat. No. 4,371,554 and carried out while the sausage is in the casing, was largely responsible for the reduction in casing cycle time and was the direct result of the initial high temperature heating step.

In the tests corresponding to the FIG. 1 embodiment, after the partial coagulating step the casing was showered or immersed in cold water for about 30 seconds and the sausage ejected. The empty casing then was processed for refilling, as shown by path 12 in FIG. 1. The "naked" sausages thus produced could have been further heated for increased redness and/or coagulation and smoked, cooled, packed and shipped, as depicted in FIG. 1 along parallel process path 14.

Should the partial coagulation step take place by means of microwave energy, the casings and/or devices used must not contain any metallic constituents. The casing support structure should advantageously consist of perforated synthetic materials like polyamide or sintered unstretched polytetrafluoroethylene.

The selection of power output of the microwave sources is of great importance for fast and even coagulation. Although the speed of coagulation is accelerated by increased power output, the evenness of the coagulation decreases. On the other hand, too small a power output is uneconomical on account of too slow a production speed. However, it is easily possible for an expert to determine the proper parameters. Rotation of the filled casings and/or devices during the microwave heating process is advisable since adjoining casings shield or block each other from the microwaves.

It is also preferred that the process of the present invention include the step of pre-wetting the casings to deposit water on the inside surface of the PTFE layer prior to the filling step. The casings can be simply showered or immersed in water, and it was found that a small but adequate amount of water adhered to the inner surface for purposes of that invention. It was believed that the water residue immediately adjacent the sausage outer layer quickly vaporizes during the high temperature heating step and provides increased heat transfer. This theory per se was not considered part of the present invention but merely an attempt to explain the observed phenomenon.

It was also found that simple rinsing could preferably be employed in place of the thorough cleaning, such as by the ultrasonic methods advocated in U.S. Pat. No. 4,371,554, at least for a significant number of filling cycles, and this is reflected in FIG. 1. It was found that a small but significant layer of fat material, but not protein, could advantageously be allowed to build-up on the inner surface of the PTFE casing and in the pores. The fat build-up was found to facilitate ejection without causing an unacceptable decrease in porosity for the porous casings used in the tests corresponding to the embodiment shown in FIG. 1. The fat build-up was found to increase up to about 20 cycles and thereafter remain constant. It is contemplated that the casing must be thoroughly cleaned periodically to comply with health standards and to prevent the retained fat from turning rancid. It is believed that the casing would have to be cleaned only once per eight hour shift, or after approximately 160 filling cycles. This decreased cleaning frequency may result in further production cost savings and increased efficiencies.

It was found during further tests that vapor-permeable casing materials having average pore sizes larger than those recommended in U.S. Pat. No. 4,371,554 can advantageously be used in the abovedescribed process if an additional, preliminary step is taken, namely to deliberately fill or plug the pores of the porous material casing layer which contacts the sausage material with fat (lipids) before filling the casing with the sausage material and applying the initial heating step. The further testing revealed that the aforementioned accumulation of fat (lipids) enters the pores, solidifies, and fills up the casing pores before the permeable casing is refilled with meat emulsions. However, this accumulation does not hinder the ability of the porous casing to radially vent water vapor and other gases because the high temperature initial heating step first melts the fat (lipids) in the pores and then pneumatically creates a gas flow path through the pores.

Fat (lipids) which normally are used for sausage production are:
(a) Backfat and belly from pork
(b) Fat enclosed by or enclosing meat muscle (intermuscular or surface fats) from pork and beef These materials consist of connective tissue (collagen), in which fat (lipids)—composed of about 98-99% of triglycerides—are embodied. During heating of the fat containing tissue, there is a release of pure fats and of fat soluble components such as fatty acids, fat soluble vitamins, cholesterols and substances which together account for less than 1%. The release of the fat from the connective tissue is greater the longer the period of heating or the higher the temperature.

The meat emulsions used in the further tests were prepared from meat muscle (lean meat), connective tissue (such as tendons and pork skin, etc.), and fat tissue containing the fats, as well as certain ingredients. The emulsifying procedure was done by cutting down the materials to very small particles with a bowlcutter or an emulsifier. During this procedure the fat tissue as well as the meat tissue is broken down to very small particles but the fat is still contained within the fat-bearing tissue pieces. The cutting, on the other hand, causes a release of water soluble proteins. These water soluble proteins surround the fat particles fixing them during the smoking and coagulating steps and thereby preventing subsequent separation.

Because polytetrafluoroethylene is lipophilic, the pores readily fill up with the meat lipids. At low temperatures these meat fats are solid and thus close off the pores during the filling of the permeable casings with meat emulsions. At higher temperatures, the fat (lipids) becomes fluid and then, when water vapor pressure develops inside the casings, the water vapor opens the pores by ejecting the fluid fat. During cooling, the fat again closes the pores so that a penetration of water soluble protein into the pores is prevented. The total pore volume normally fills up very slowly during sausage production because there are only small amounts of fat released from the bulk sausage. It was found that about 10-20 cycles are needed to achieve saturation. But it was also found that the portions of the pores adjacent to the bulk sausage can take up sufficient fat to close after the first cycle.

The further testing was carried out using casings made from porous PTFE tubes having an average pore size of about 1-2 μm commercially available from Chemplast, Inc., Wayne, N.J. under the designation Zitex G-100. Before their initial use, some of these casings were coated on the inside surface with a vegetable oil-based food release agent (PAM, sold by Boyle Midway Inc., New York, N.Y.) while others were rinsed with heated fat, tallow, pork fat, etc. (normally solid at room temperature) which solidified within the casing pores during cooling. The casings were then filled with unprocessed sausage material and initially heated by placing them in a hot air oven at 200°-220° C. for about 2 minutes. In some cases, the filled casings were cooled without further in-casing heating, the formed sausages axially ejected, and the casings simply rinsed and then refilled, etc. In other cases it was found that the sausage could be successfully ejected immediately after the initial heating step, that is, without either additional heating or subsequent cooling. Although the first formed sausage from each casing could be ejected with slight pressure, in each case the sausages formed subsequently were ejected more easily and, in most instances, could be slid out by gravity alone.

This further testing confirmed that the fat (lipids) plugging the pores appears to function like a valve, that is, melting and opening under the effect of the evolving steam and water vapor during the high temperature initial heating step, and then closing by solidifying after the ejection step. Although the oil-based food release agent used to initially coat some of the casings did not contain meat lipids, the fat (lipids) in the sausage mixture, primarily meat lipids which are predominantly saturated triglycerides, dissolved in the unsaturated oil lipids and then migrated into the pores of the casings providing a solid plug in subsequent cycles. As stated previously, it was found that the inside surface of the permeable casing can be initially coated with saturated lipids such as liquified animal fat before the initial filling, or before the first filling following a thorough cleaning.

These observations are significant because previous tests without the pores being filled with fat (lipids) and using a process not including a high temperature initial heating step demonstrated that water soluble proteins and other protein matter could migrate into pores of 1-2 μm average size during processing and coagulating, thereby preventing radial venting of water vapor and other gases, and hindering or preventing ejection and causing unwanted sausage surface roughness. It thus appears that materials having larger average pore sizes could be used successfully in the process of the present invention when compared to the microporous polytetrafluoroethylene casing materials preferred in U.S. Pat. No. 4,371,554 which had an average pore size of about 0.2 μm. Thicker walled and thus stronger casings can be employed while retaining an acceptable level of permeability to provide adequate radial venting where needed. The 1-2 μm porous PTFE tubes used in the further tests were about 12 cm in length and had an I.D. of about 2 cm and an average wall thickness of about 1 mm. The tubes were relatively stiff-walled and held their shape during filling without the need for an external support.

Although the sausage surface temperatures were not actually measured in these further tests, it is believed that in the initial heating step of the present process the temperatures on the surface of the bulk sausages are below about but approach 100° C., with the exact surface temperature depending on the thickness of the casing, time of the heat treatment, and the oven temperature. It is believed that the sausage surface temperature should be high enough to cause the fat to melt out from the fat tissue, penetrate through the meat proteins, and migrate into the porous casing.

It appeared from the further testing that after the plugged pores are opened by the water vapor released by the sausage material adjacent the casing inner surface during the high temperature heating step, any fat (lipids) removed from the pores is replaced by fat (lipids) migrating from the sausage material. It also is believed that the high temperatures used in the initial heating step cause preferential migration of the meat lipids, while suppressing the migration of protein matter, including water soluble proteins, into the pores. Again, this theory per se should not be considered a part of the present invention but merely an attempt to explain the observed phenomenon. However, this preferential migration of fat (lipids) to the sausage surface may enable porous organo-polymeric materials different from porous PTFE to be utilized in the skinless sausage making process, as the accumulation of fat (lipids) between the formed sausage and the casing inner surface would be expected to counteract the differences in the food release properties exhibited by the non-PTFE materials when compared to porous PTFE. Of course, these porous non-PTFE materials must have the capability of withstanding the temperatures used in the processing and be compatible with foodstuffs.

Figure 2:
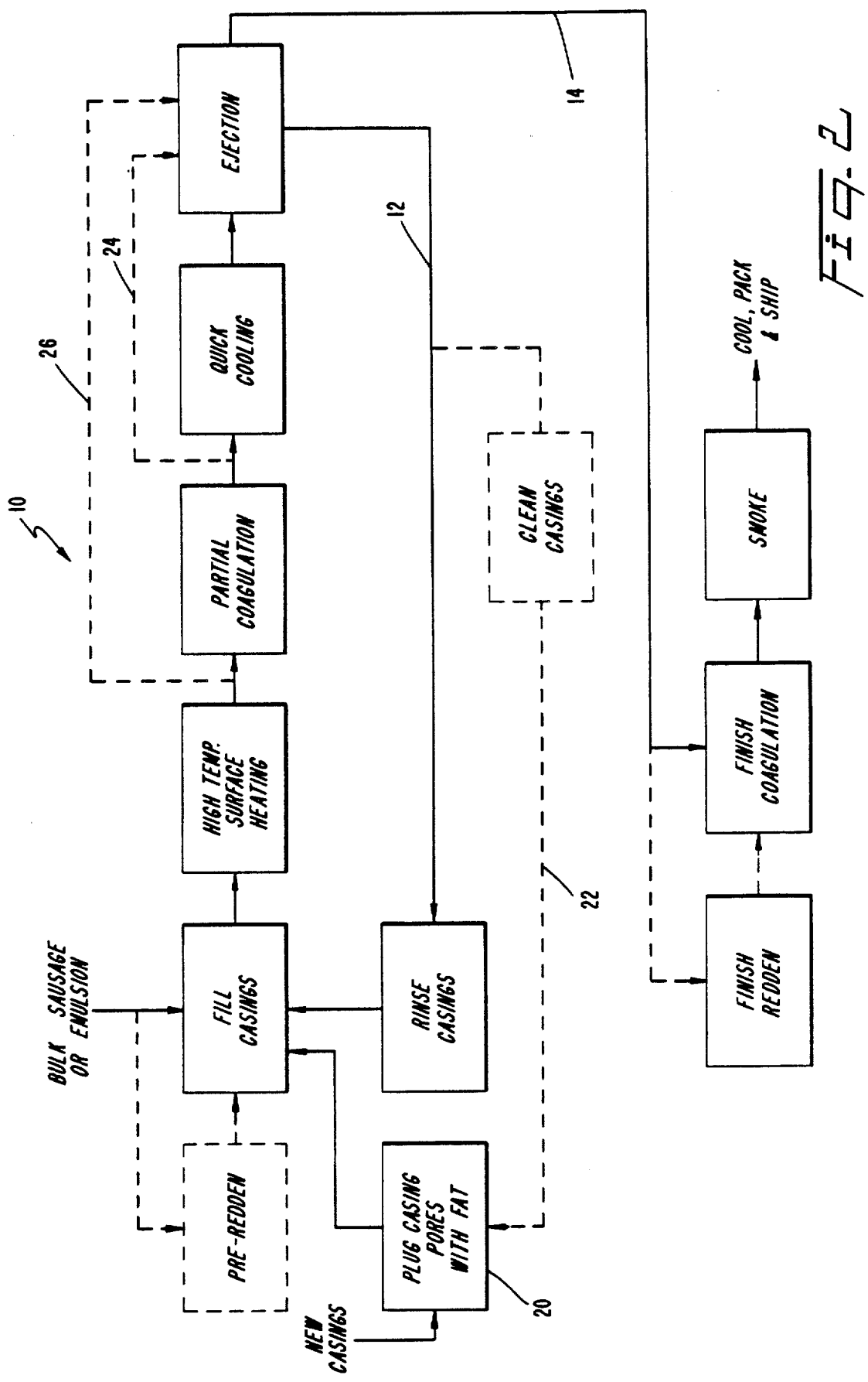
FIG. 2 is a schematic diagram of another embodiment of the process of the invention for making skinless sausages.

With reference to the FIG. 2 embodiment of the process of the present invention, step 20 requires, before filling, plugging casing pores with fat (lipids) to be applied to new casings or casings having been thoroughly cleaned, that is, the fat (lipids) having been cleaned from the pores (alternative process path 22). Otherwise, as shown by process path 12, the empty casings are simply rinsed and then refilled, the pores remaining plugged with fat (lipids) from the previous cycle. Alternative path 24 in FIG. 2 depicts the variation wherein both the separate partial coagulation step (e.g. microwave heating) and the quick cooling step are eliminated. The further testing showed that these separate process steps were not required for making skinless sausages of the frankfurter size. However, for larger sausage size (e.g. bologna, etc.) it may be preferred to have a separate partial coagulation step, using microwave heating, for instance, and/or a quick cooling step.

Further research has shown additional, surprising advantages and benefits of the initial high temperature heating step explained previously, in terms of the preferential coagulation of protein material in the surface layer of the sausage material and the concurrent release and migrations of fat (lipids) from the surface, skin-like layer. It has now been determined that some types and sizes of parboil and raw sausages can advantageously be prepared using reusable tubular casings formed of a material substantially impermeable to the flow of gas. The ability to produce these types of caseless sausages without the need for a material capable of radially venting water vapor and other gases evolved during the initial heating step should enable the use of a wider range of casing materials (non-porous, marginally porous, as well as porous) for making reusable casings for certain sausage types and sizes, with possible attendant cost savings.

In accordance with the present invention, the process for using a high temperature initial heating step with a gas-impermeable casing includes the steps of filling the impermeable casings with sausage material, then initially heating the outside surface of the casing for a time and high temperature sufficient to create a skin-like layer of coagulated protein on the surface of the sausage and an accumulation on the casing inner surface of fat (lipids) released from the sausage skin-like layer, which layer will enable the formed sausage to be self-supporting during the subsequent ejection step. The accumulation of fat (lipids) at the inner casing surface promotes ejection and, in a preferred casing made of polytetrafluoroethylene (PTFE) will be absorbed into the impermeable PTFE material itself and facilitate ejection during subsequent cycles, if not removed by cleaning.

Figure 3:
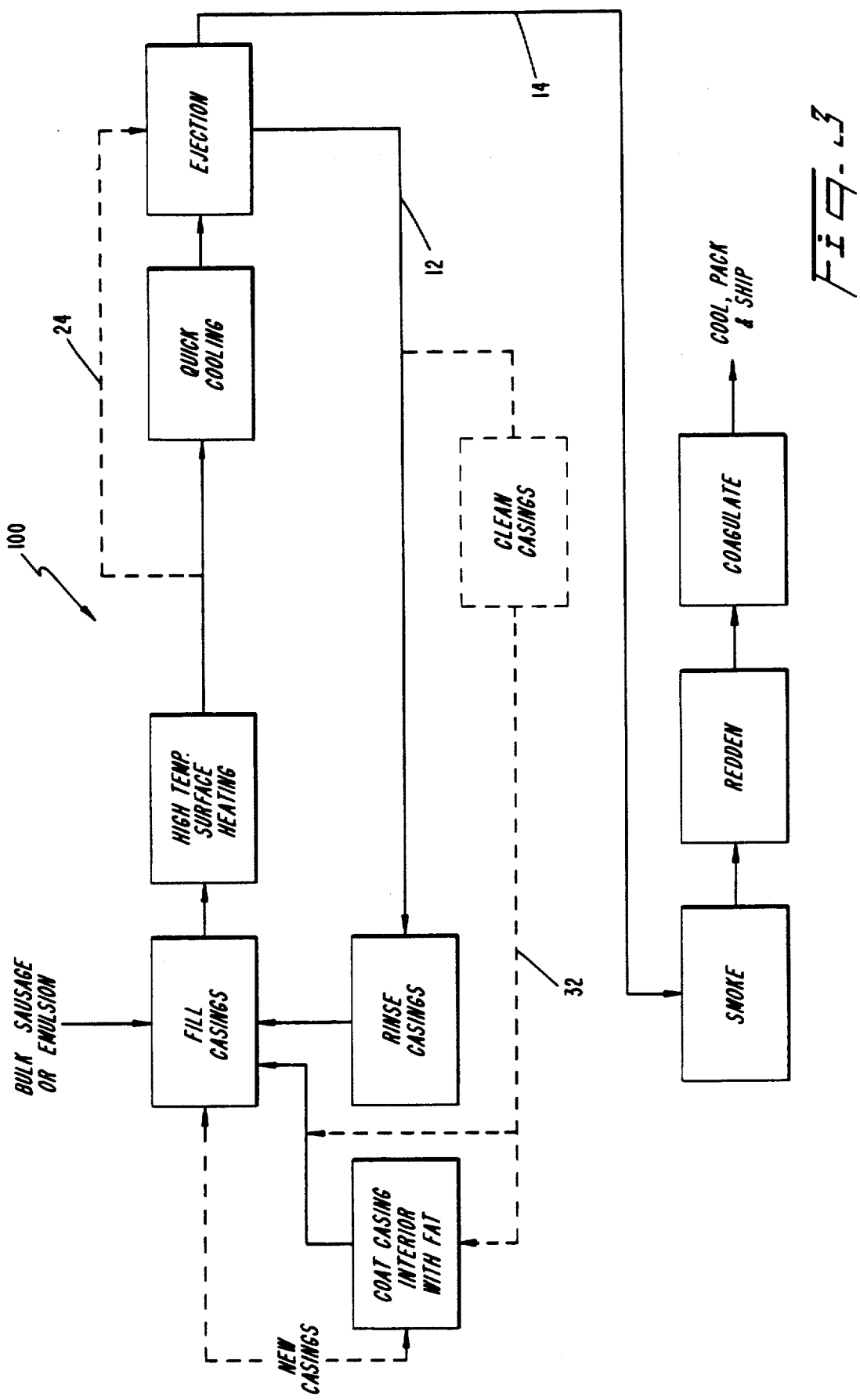
FIG. 3 is a schematic diagram of a third embodiment of the process of the present invention for making skinless sausages.

A preferred embodiment which uses reusable impermeable casings in conjunction with a high temperature initial heating step is depicted in FIG. 3. The FIG. 3 process for the most part follows the earlier discussion of the FIGS. 1 and 2 processes, which utilize porous casing material. However, as there are no pores, it may not be necessary to coat new (and thoroughly cleaned—see path 32) casings with fat (lipids) prior to the initial filling, particularly for casings like PTFE materials having a low coefficient of friction in respect to the sausage material. For other materials, initially coating the new (and thoroughly cleaned) casings with fat (lipids) may provide better initial release properties. Lipophilic materials such as PTFE that are able to retain the fat (lipids) can advantageously be used in the process of the present invention.

As further distinguished from the process embodiments shown in FIGS. 1 and 2, the sausages should be ejected from the casings before any substantial coagulation of the sausage material is effected because the impermeable casings will not allow the release of the steam, water vapor, and other gases released during the coagulation process. It has been found that the gases and water vapor released during the coagulation of the small amount of material to form the skin-like layer can be accommodated within the casing and sausage material itself. This accommodation, together with the fact that the sausage material remains essentially stationary within the casing during the high temperature initial heating step, permits the formation of a skin-like layer sufficiently strong to allow ejection and handling (smoking, coagulating, etc.) outside the casing. As with the process shown in FIG. 2, it may be possible to avoid the quick cooling step and eject immediately after removal from the apparatus used to accomplish high temperature surface heating. This is shown as alternative path 24 in the FIG. 3 schematic.

In comparisons to FIG. 2 and the path 14 of the sausage following ejection from the reusable porous casing, it is preferable in the FIG. 3 embodiment to first smoke the sausage in order to immediately provide a tanning effect that will further safeguard the integrity of the skin-like layer formed on the sausage, and then to accomplish reddening and coagulation. If final reddening and final coagulation steps are used, the heating temperature for the reddening step should be below the heating temperature for the final coagulation step. In order to utilize the present invention to its fullest capability with impermeable casings, it is believed that no pre-reddening of the sausage material should be done before filling the casings. The pre-reddening step takes time which means the meat emulsion must be prepared long before the filling step and as a consequence of the elapsed time, can suffer a decrease in the water binding capacity. Minimizing the amount of gases evolved from the surface area of the sausage during the skin-like layer formation would be expected to provide for better process control and a more uniform sausage product, particularly when impermeable reusable casings are used.

The above-described process was used to make two different types of sausage, a frankfurter type and a "minisalami" type more commonly known as "beer sticks". The casings used were solid (impermeable) PTFE Chemloy® tubes from Crane Packing Co., Morton Grove, Ill.

The Chemloy® tubes used for the frankfurter sausage had an I.D. of 25 mm, a wall thickness of about 1 mm, and a length of about 15 cm. The PTFE material was stated to have a density of between about 2.14 and 2.20 g/cc. The tubes were filled with sausage mixture consisting of an emulsion of meat (pork), fat, and water which leaves the cutter at about 14°-16° C. with a water content of about 60%. The filled tubes were then closed with non-porous PTFE end caps. Some of the filled tubes were placed in a circulating hot air oven at 175° C. for about 3 minutes and others were similarly treated but at 250° C. for between about 1 minute 45 seconds and 2 minutes. The filled casings were then uncapped without deliberate cooling and the sausages were observed to slide out. Visual observation and handling confirmed that the ejected sausages could retain their own integrity. Upon cutting some of the sausages, it was found that only a small amount of coagulation had occurred in the interior of the sausage, away from the skin-like layer. This indicated that the skin-like layer was predominantly responsible for the integrity of the sausages.

The skins formed by the high temperature initial heating step averaged less than 1 mm and were about ½ mm in thickness, and it appeared that higher temperature and shorter duration initial heating conditions provide thinner skins, possibly due to the steeper temperature gradient into the sausage.

Thereafter the formed sausages were smoked in a smoking chamber for 30 minutes at 55° C. and about 65–70% relative humidity (RH). Next, the sausages were dried for 15 minutes at a very low relative humidity (zero setting on the smokehouse humidity control), and then reddened at 55° C. in the same smoking chamber for 30 minutes at 70% RH. The sausages were then finally coagulated by heating for an additional 10-15 minutes but at 100% RH. After cooling by a water shower, the sausages were found to have an acceptable appearance, texture and flavor.

The smoking and drying steps can be tailored to influence the final skin thickness. For instance, lower relative humidities during the smoking step will, in general, result in a thicker skin.

For the minisalami sausages, the same size Chemloy ® tubes were used. The tubes were filled with a mixture of meat and fat which exits the cutter at −4° C., and then end caps applied. The filled tubes were then subjected to the same initial heating conditions as the frankfurter type. Again, each of the formed sausages could be ejected as an integral shaped mass and held its shape during subsequent handling.

Following ejection, the minisalami sausages were smoked at 26° C. and about 65-70% RH for 30 minutes and then allowed to stabilize for about 24 hours at 25° C. and RH between about 50-60% with the lower RH values occurring toward the end of the stabilizing period. During this period a moisture loss of about ⅓ occurs; the original moisture content of the sausage mixture was about 40%. As with the frankfurter type sausages, the completed minisalami sausages were acceptable from the standpoint of appearance, texture and flavor.

Minisalami type sausages are conventionally cured (dried) in the casings and at room temperature to avoid rendering the fat and spoiling the sausage. The drying times can be advantageously reduced by the present process because the sausages can be dried outside the casing.

These same new sausage types were also made using the initial high temperature heating step but with porous tube casings from Chemplast (20 mm I.D., about 1 mm in thickness). The finished sausages were also acceptable, and no significant difference between these and the sausages made using the impermeable tube casings was observed. It is believed, however, that for sausage sizes larger than about 50 mm diameter, porous casings probably must be used to allow radial venting of gases and water vapor, in that a greater degree of partial coagulation of the inner sausage material must be accomplished in the casing to provide sufficient firmness and integrity for ejection. This is particularly true for emulsion-type sausage mixtures having an initial moisture content of greater than about 60%.

As with the tests using a porous tubular casing, it was determined that sausages made using new or thoroughly cleaned impermeable casing were slightly more difficult to eject than sausages from subsequent cycles reusing the same casing, for instances where no fat (lipid) coating was applied to the new casing. Although not porous to gas, the impermeable PTFE casings were found to absorb significant amounts of fat (lipids) as was evidenced by measured weight increases of 17 mg for small size tubes, and about 22 mg for the larger sizes. Also, the initially white opaque tubular casings were observed to become progressively more translucent owing to absorbed fat (lipids).

Several different types of impermeable plastic materials were used during the overall course of the experiments and tests. In addition to impermeable PTFE tubes (24 mm I.D.) tubes made from clear polypropylene (28 mm I.D.) and a green epoxy resin material having an embedded fiber glass backing were used. End caps of impermeable PTFE, Delrin ® (Dupont Trademark for an acetal resin-type plastic material), clear polyethylene, and PVC were used, and it was found that frankfurter and minisalami types could be ejected, with a continuous coagulated protein skin and a substantially uncoagulated interior, from all three tube materials. However, the sausages did not eject as easily from the polypropylene tubes as from the PTFE tubes. Sausages could be ejected from both tubes more easily after several cycles with only water rinse between cycles. And, the sausages made using the epoxy tubes had an off-odor and taste, possibly making the use of this material not commercially attractive.

Based on the performance of the end caps, it is expected that polyethylene tubes (as well as PTFE and polypropylene) would perform satisfactorily, but probably not tubes of acetal resin plastic or PVC. The PVC caps melted in the 175° C. oven possibly indicating temperature limitations for this material. Also PVC may not be allowed by the government in the preparation of heated foodstuffs because of the possible release of unbonded vinyl chloride.

In regard to acetal resin plastic material, the sausage material stuck to the Delrin ® end caps and caused partial rupture of the formed skin-like layer at the ends of the sausages. It is currently believed that strongly polar materials such as acetal resin plastic would not perform satisfactorily as some of the protein material would become bonded to the casing during coagulation of the skin layer. Non-polar or weakly polar materials such as PTFE, polyethylene, and polypropylene would be expected to perform satisfactorily under this theory, although the theory per se is not to be considered a part of the claimed invention.

In summary, it appears that casing materials should be heat resistant, lipophilic, non-polar and be compatible with foodstuffs. Also, the casing materials should be resistant to swelling in the presence of fats (lipids), and be resistant to any solvents used in a thorough cleaning process. It is further understood that various casing cross-sectional shapes (round, square, etc.) and different casing constructions can be used in the process of the present inventions as, for instance, a metal tube having liner of e.q. PTFE bonded to the inner surface of the tube. If microporous PTFE is used for the inner layer, the metal outer layer should be highly porous. The metal outer layer (e.g. stainless steel) would be expected to provide strength and better heat transfer. This construction could allow the use of "clamshell"-type casing wherein the sausage material could be removed from the casing without ejection along the longitudinal axis.

The new improved process of the invention provides a sausage that, such as the sausages produced by the process disclosed in U.S. Pat. No. 4,371,554, has far superior resistance to bacterial contamination than sausages produced in the usual one-use, cellulosic casings which are the present industry standard for frankfurter production. The process of the present invention also is markedly superior to the process disclosed in U.S. Pat. No. 4,371,554 which utilizes pliable porous reusable PTFE casings in that the sausage material spends less time in the casing permitting parallel processing and reduces cycle times for the casings. Additionally, the process disclosed herein permits in some applications the use of substantially impermeable casing materials which, in turn, allow the use of stronger, more durable casings to be employed.

While the invention has been disclosed herein in connection with certain embodiments and certain structural and procedural details, it is clear that changes, modifications or equivalents can be sued by those skilled in the art. Accordingly, such changes within the principles of the invention are intended to be included within the scope of the following claims.

What is claimed is:

1. A process for the production of caseless parboil or raw sausages using a multiple-reusable tubular casing have an exposed outer surface and a sausage-contacting inner surface, the process comprising the steps of:
   (a) filling the reusable casing with sausage material containing protein and fat (lipids);
   (b) initially hating the outer surface of the filled casing to greater than 130° C. for a time sufficient to concurrently
      (i) coagulate substantially only the sausage material protein immediately adjacent the inner surface of the casing to rapidly form a skin-like layer, said layer being thin relative to the diameter of said casing, and
      (ii) release the fat (lipids) from the sausage material in the skin-like layer, the released fat (lipids) flowing to, and collecting at, said inner surface of the casing, said sausage material remaining essentially stationary with respect to the casing during said initially heating step; and
   (c) removing the sausage material from the tubular casing with the integrity of the skin-like layer being maintained, the integrity of the casing also being maintained during the removing step,
      wherein the time and temperature of the initial heating step are selected to provide a continuous skin-like layer of coagulated protein material sufficiently cohesive to support the contained sausage material for subsequent processing,
   wherein the process includes the preliminary step of selecting a casing wherein the casing portion forming the inner sausage-contacting surface is substantially impermeable to gas and is formed from a material which is lipophilic, relatively non-polar, heat resistant, compatible with foodstuffs, resistant to swelling in the presence of fats, and resistant to solvents, and
   wherein the process further comprises the step of selecting maximum casing diameters in accordance with the water content of the sausage material to be filled into the casing.

2. Process as in claim 1 including selecting a reusable casing wherein said casing portion is polytetrafluoroethylene.

3. Process as in claim 1 wherein casings with a diameter of less than about 50 mm and sausage material with a water content less than or equal to about 60% are selected.

4. Process as in claim 1 wherein the temperature of the initial heating step is greater than about 175° C.

5. Process as in claim 1 wherein the temperature of the initial heating step is between about 175° C. and about 250° C.

6. Process as in claim 1 wherein the temperature of the initial heating step is about 175° C. and the time duration of said initial heating step is about 3 minutes.

7. Process as in claim 1 wherein the temperature of the initial heating step is about 250° C., and the time duration of said initial heating step is about 2 minutes.

8. Process as in claim 1 including the further step of smoking the removed sausage material.

9. Process as in claim 1 wherein the sausage material distant from the sausage-contacting surface is substantially uncoagulated at the time of the removal step, the process including the further step of heating the removed sausage material with the skin-like layer to coagulate the interior portion of the sausage.

10. Process as in claim 1 including the further step of heating the removed sausage material with the skin-like layer to redden the interior portion.

11. Process as in claim 1 wherein the casing selection step includes selecting a casing from the group consisting of new casings and casings having been cleaned to remove adhered fat, the process including the further preliminary step of coating the sausage-contacting surface with fat before filling.

12. Process as in claim 1 wherein some of the collecting fat adheres to said casing inner surface, the process including the further step of, after the removal step, rinsing the reusable casings without removing all of said adhered fat, said rinsing step being accomplished before refilling said reusable casings with uncoagulated sausage material.

* * * * *